Patented Apr. 17, 1934

1,955,355

UNITED STATES PATENT OFFICE 1,955,355

ASPHALTIC COATING COMPOSITIONS AND MATERIALS COATED THEREWITH

Alfonso M. Alvarado, Wilmington, Del., and Arthur N. Parrett, Milwaukee, Wis., assignors to E. I. du Pont de Nemours & Company, Wilmington, Del., a corporation of Delaware No Drawing. Application November 24, 1930, Serial No. 497,836

10 Claims. (Cl. 91—70)

This invention relates to an improved asphalt varnish and to products coated therewith. More particularly this invention relates to artificial leather comprising fabrics or other flexible sheet material provided with a top coat of the improved asphalt varnish.

Asphalt varnishes, as disclosed in the application of John R. Couture, Serial No. 122,737, filed July 15, 1926, have been found to be especially valuable as a final coat for materials, such as automobile top materials, which are exposed to the sun and weather. These varnishes have been improved in certain respects by the incorporation of synthetic resins of the oil modified polyhydric alcohol-polybasic acid type as disclosed in the application of Andrew J. Hemmer, Serial No. 478,549, filed August 28, 1930. Additional advantages resulting from the use of rosin and oil modified polyhydric alcohol-polybasic acid resins in asphalt varnishes are disclosed in the application of Harold J. Barrett, Serial No. 512,738, filed of even date herewith. We have discovered that these varnishes comprising asphalt and polyhydric alcohol-polybasic acid resins may be further improved, as will more fully appear in the following specification.

This invention has as an object the production of improved asphalt varnishes.

A further object resides in the production of an improved artificial leather or coated fabric, which is especially adapted for use as an automobile top material. Other objects will appear hereinafter.

We have discovered that our improved coating composition consisting of asphalt varnishes containing polyhydric alcohol-polybasic acid resins are improved with respect to the compatibility of the resin with the asphalt if an organic iron compound is incorporated into the coating composition. We have also found that the durability of the film produced from the asphalt varnish, as well as the capability of the film to retain a high luster on exposure to atmospheric influence for a long period of time, is also improved by the addition of the organic iron compound. We have further discovered that the improvements referred to are much more marked when resins of low phthalic glyceride content, and resins modified with natural acidic resins or naphthenic acids, such as disclosed in the Barrett application mentioned, are used.

With the above and other objects in view, which will be apparent as the description proceeds, we have set forth our invention in the following specification and have included the following examples by way of illustration and not as a limitation.

Example 1

| | Parts by weight |
|---|---|
| Petroleum asphalt | 100 |
| Solvent naphtha | 120 |
| Resin A (acid No. 15.4) | 160 |
| Turpentine | 160 |
| Iron oleate | 20 |
| | 560 |

The asphalt is heated to 500° F., allowed to cool to 425° F., an equal weight of solvent naphtha is added, and the mixture is stirred until the asphalt is completely dissolved. To this solution is added 320 parts by weight of a 50% solution of resin A in turpentine and 40 parts by weight of an iron oleate solution containing 4% iron.

Resin A, used in the above composition, was formed from the following ingredients, using the proportions indicated:

| | Parts by weight |
|---|---|
| Glycerol | 11.05 |
| Phthalic anhydride | 7.30 |
| Linseed oil acids | 67.95 |
| Rosin | 13.70 |
| | 100.00 |

Example 2

| | Parts by weight |
|---|---|
| Petroleum asphalt | 100.00 |
| Solvent naphtha | 165.58 |
| Resin B (acid No. 19.1) | 240.00 |
| Turpentine | 240.00 |
| Iron resinate | 32.82 |
| | 778.40 |

The asphalt is heated to 500° F., allowed to cool to 425° F., an equal weight of solvent naphtha is added, and the mixture is stirred until the asphalt is completely dissolved. To this solution is added 480 parts by weight of a 50% solution of resin B in turpentine and 98.4 parts by weight of a solution of iron resinate containing 2.44% iron.

Resin B, used in the above composition, was formed from the following ingredients, using the proportions indicated:

| | Parts by weight |
|---|---|
| Glycerol | 12.37 |
| Phthalic anhydride | 10.90 |
| Linseed oil acids | 76.73 |
| | 100.00 |

Example 3

| | Parts by weight |
|---|---|
| Petroleum asphalt | 100.00 |
| Solvent naphtha | 110.93 |
| Resin C (acid No. 21.9) | 40.00 |
| Turpentine | 40.00 |
| Iron resinate | 5.47 |
| | 296.40 |

The asphalt is heated to 500° F., allowed to cool to 425° F., an equal weight of solvent naphtha is added, and the mixture is stirred until the asphalt is completely dissolved. To this solution is added 80 parts by weight of a 50% solution of resin C in turpentine and 16.4 parts by weight of a solution of iron resinate containing 2.44% iron.

Resin C used in the above composition, was formed from the following ingredients, using the proportions indicated:

| | Parts by weight |
|---|---|
| Glycerol | 17.19 |
| Phthalic anhydride | 27.36 |
| Linseed oil acids | 55.45 |
| | 100.00 |

Example 4

| | Parts by weight |
|---|---|
| Petroleum asphalt | 100.00 |
| Solvent naphtha | 129.40 |
| Resin D (acid No. 22.1) | 160.00 |
| Turpentine | 160.00 |
| Iron linoleate | 29.40 |
| | 578.80 |

The asphalt is heated to 500° F., allowed to cool to 425° F., an equal weight of solvent naphtha is added, and the mixture is stirred until the asphalt is completely dissolved. To this solution is added 320 parts by weight of a 50% solution of resin D in turpentine and 58.8 parts by weight of a solution of iron linoleate containing 2.73% iron.

Resin D, used in the above composition, was formed from the following ingredients, using the proportions indicated:

| | Parts by weight |
|---|---|
| Glycerol | 12.91 |
| Phthalic anhydride | 13.82 |
| Linseed oil acids | 55.98 |
| Rosin | 17.29 |
| | 100.00 |

Example 5

| | Parts by weight |
|---|---|
| Gilsonite | 100.00 |
| Solvent naphtha | 102.50 |
| Resin E (acid No. 49.2) | 20.00 |
| Turpentine | 20.00 |
| Iron oleate | 2.50 |
| | 245.00 |

The gilsonite is heated to 500° F., allowed to cool to 425° F., an equal weight of solvent naphtha is added, and the mixture is stirred until the gilsonite is completely dissolved. To this solution is added 40 parts by weight of a 50% solution of resin E in turpentine and 5 parts by weight of a solution of iron oleate containing 4% iron.

Resin E, used in the above composition was formed from the following ingredients, using the proportions indicated:

| | Parts by weight |
|---|---|
| Glycerol | 11.23 |
| Adipic acid | 7.96 |
| Linseed oil acids | 67.25 |
| Rosin | 13.56 |
| | 100.00 |

Example 6

| | Parts by weight |
|---|---|
| Petroleum asphalt | 100.00 |
| Solvent naphtha | 132.79 |
| Resin F (acid No. 64.39) | 120.00 |
| Turpentine | 120.00 |
| Iron resinate | 17.41 |
| | 490.20 |

The asphalt is heated to 500° F., allowed to cool to 425° F., an equal weight of solvent naphtha is added, and the mixture is stirred until the asphalt is completely dissolved. To this solution is added 240 parts by weight of a 50% solution of resin F in turpentine and 82 parts by weight of a solution of iron resinate containing 2.44% iron.

Resin F, used in the above composition, was formed from the following ingredients, using the proportions indicated:

| | Parts by weight |
|---|---|
| Glycerol | 11.84 |
| Succinic acid | 7.66 |
| Linseed oil acids | 66.98 |
| Rosin | 13.52 |
| | 100.00 |

Example 7

| | Parts by weight |
|---|---|
| Petroleum asphalt | 100.00 |
| Solvent naphtha | 112.50 |
| Resin G (acid No. 63.81) | 100.00 |
| Turpentine | 100.00 |
| Iron oleate | 12.50 |
| | 425.00 |

The asphalt is heated to 500° F., allowed to cool to 425° F., an equal weight of solvent naphtha is added, and the mixture is stirred until the asphalt is completely dissolved. To this solution is added 200 parts by weight of a 50% solution of Resin G in turpentine and 25 parts by weight of a solution of iron oleate containing 4% iron.

Resin G, used in the above composition, was formed from the following ingredients, using the proportions indicated:

| | Parts by weight |
|---|---|
| Glycol | 10.95 |
| Phthalic anhydride | 7.29 |
| Linseed oil acids | 68.04 |
| Rosin | 13.72 |
| | 100.00 |

Example 8

| | Parts by weight |
|---|---|
| Petroleum asphalt | 100.00 |
| Solvent naphtha | 153.65 |
| Resin H (acid No. 13.53) | 200.00 |
| Turpentine | 200.00 |
| Iron resinate | 28.35 |
| | 682.00 |

The asphalt is heated to 500° F., allowed to cool to 425° F., an equal weight of solvent naphtha is added, and the mixture is stirred until the asphalt is completely dissolved. To this solution is added 400 parts by weight of a 50% solution of resin H in turpentine and 82 parts by weight of a solution of iron resinate containing 2.44% iron.

Resin H, used in the above composition, was formed from the following ingredients, using the proportions indicated:

| | Parts by weight |
|---|---|
| Glycerol | 10.29 |
| Phthalic anhydride | 7.33 |
| Linseed oil acids | 68.29 |
| Kauri | 14.09 |
| | 100.00 |

Example 9

| | Parts by weight |
|---|---|
| Petroleum asphalt | 100.00 |
| Solvent naphtha | 106.00 |
| Resin I (acid No. 25) | 48.00 |
| Turpentine | 48.00 |
| Iron oleate | 6.00 |
| | 308.00 |

The asphalt is heated to 500° F., allowed to cool to 425° F., an equal weight of solvent naphtha is added, and the mixture is stirred until the asphalt is completely dissolved. To this solution is added 96 parts by weight of a 50% solution of resin I in turpentine and 12 parts by weight of a solution of iron oleate containing 4% iron.

Resin I, used in the above composition, was formed from the following ingredients, using the proportions indicated:

| | Parts by weight |
|---|---|
| Glycerol | 10.17 |
| Phthalic anhydride | 3.65 |
| Linseed oil acids | 81.61 |
| Rosin | 4.57 |
| | 100.00 |

Example 10

| | Parts by weight |
|---|---|
| Petroleum asphalt | 100.00 |
| Solvent naphtha | 114.70 |
| Resin J (acid No. 24) | 80.00 |
| Turpentine | 80.00 |
| Iron linoleate | 14.70 |
| | 389.40 |

The asphalt is heated to 500° F., allowed to cool to 425° F., an equal weight of solvent naphtha is added, and the mixture is stirred until the asphalt is completely dissolved. To this solution is added 160 parts by weight of a 50% solution of resin J in turpentine and 29.4 parts by weight of a solution of iron linoleate containing 2.73% iron.

Resin J, used in the above composition, was formed from the following ingredients, using the proportions indicated:

| | Parts by weight |
|---|---|
| Glycerol | 11.07 |
| Phthalic anhydride | 7.30 |
| Linseed oil acids | 36.24 |
| China wood oil acids | 31.69 |
| Rosin | 13.70 |
| | 100.00 |

Example 11

| | Parts by weight |
|---|---|
| Petroleum asphalt | 100.00 |
| Solvent naphtha | 121.86 |
| Resin K (acid No. 21) | 80.00 |
| Turpentine | 80.00 |
| Iron resinate | 10.94 |
| | 392.80 |

The asphalt is heated to 500° F., allowed to cool to 425° F., an equal weight of solvent naphtha is added, and the mixture is stirred until the asphalt is completely dissolved. To this solution is added 160 parts by weight of a 50% solution of resin K in turpentine and 32.8 parts by weight of a solution of iron resinate containing 2.44% iron.

Resin K, used in the above composition, was formed from the following ingredients, using the proportions indicated:

| | Parts by weight |
|---|---|
| Glycerol | 6.66 |
| Phthalic anhydride | 7.49 |
| China wood oil acids | 23.29 |
| Deodorized sardine oil | 48.47 |
| Rosin | 14.09 |
| | 100.00 |

Example 12

| | Parts by weight |
|---|---|
| Gilsonite | 100.00 |
| Solvent naphtha | 143.62 |
| Resin L (acid No. 28.2) | 160.00 |
| Turpentine | 160.00 |
| Iron resinate | 21.88 |
| | 585.50 |

The gilsonite is heated to 500° F., allowed to cool to 425° F., an equal weight of solvent naphtha is added, and the mixture is stirred until the gilsonite is completely dissolved. To this solution is added 320 parts by weight of a 50% solution of resin L in turpentine and 65.4 parts by weight of a solution of iron resinate containing 2.44% iron.

Resin L, used in the above composition, was formed from the following ingredients, using the proportions indicated:

| | Parts by weight |
|---|---|
| Glycerol | 14.11 |
| Phthalic anhydride | 16.88 |
| Linseed oil acids | 69.01 |
| | 100.00 |

Example 13

| | Parts by weight |
|---|---|
| Petroleum asphalt | 100.00 |
| Solvent naphtha | 110.93 |
| Resin M (acid No. 22.8) | 40.00 |
| Turpentine | 40.00 |
| Iron resinate | 5.47 |
| | 296.40 |

The asphalt is heated to 500° F., allowed to cool to 425° F., an equal weight of solvent naphtha is added, and the mixture is stirred until the asphalt is completely dissolved. To this solution is added 80 parts by weight of a 50% solution of resin M in turpentine and 16.4 parts by weight of a solution of iron resinate containing 2.44% iron.

Resin M, used in the above composition, was formed from the following ingredients, using the proportions indicated:

| | Parts by weight |
|---|---|
| Glycerol | 8.47 |
| Phthalic anhydride | 11.17 |
| China wood oil acids | 37.02 |
| Perilla oil | 43.34 |
| | 100.00 |

Example 14

| | Parts by weight |
|---|---|
| Petroleum asphalt | 100.00 |
| Solvent naphtha | 116.40 |
| Resin N (acid No. 16.8) | 60.00 |
| Turpentine | 60.00 |
| Iron resinate | 8.20 |
| | 344.60 |

The asphalt is heated to 500° F., allowed to cool to 425° F., an equal weight of solvent naphtha is added, and the mixture is stirred until the asphalt is completely dissolved. To this solution is added 120 parts by weight of a 50% solution of resin N in turpentine and 24.6 parts by weight of a solution of iron resinate containing 2.44% iron.

Resin N, used in the above composition, was formed from the following ingredients, using the proportions indicated:

| | Parts by weight |
|---|---|
| Glycerol | 13.61 |
| Phthalic anhydride | 10.81 |
| China wood oil acids | 35.82 |
| Coconut oil acids | 39.76 |
| | 100.00 |

Example 15

| | Parts by weight |
|---|---|
| Petroleum asphalt | 100.00 |
| Solvent naphtha | 107.50 |
| Resin O (acid No. 23.4) | 60.00 |
| Turpentine | 60.00 |
| Iron oleate | 7.50 |
| | 335.00 |

The asphalt is heated to 500° F., allowed to cool to 425° F., an equal weight of solvent naphtha is added, and the mixture is stirred until the asphalt is completely dissolved. To this solution is added 120 parts by weight of a 50% solution of resin O in turpentine and 15 parts by weight of a 50% solution of iron oleate containing 4% iron.

Resin O, used in the above composition, was formed from the following ingredients, using the proportions indicated:

| | Parts by weight |
|---|---|
| Glycerol | 8.47 |
| Phthalic anhydride | 11.17 |
| China wood oil acids | 37.02 |
| Menhaden oil | 43.34 |
| | 100.00 |

While a wide variety of iron compounds may be employed, we prefer to use the iron salts, either ferrous or ferric, of such acids as abietic acid, oleic acid, linseed oil acids, China wood oil acids, and similar compounds, because these materials are easily prepared either by precipitation or fusion processes. While we prefer to use enough iron compound so that the system contains about 1% iron, based on the resin content of the varnish, good results are obtained if this amount is varied, for example between 0.5% and 4.0%. However, quantities larger than 1.0% are not especially advantageous except in difficultly compatible systems.

These organic iron compounds function as blending agents between the resin and asphalt and make possible the production of asphalt varnishes containing a much larger proportion of resin than when organic salts of other metals are used. While the organic iron compounds herein disclosed will function as driers, as do other organo-metallic compounds, it is to be understood that the invention resides, not in the use of these iron compounds as driers, but in the discovery that the iron compounds impart improved properties to the asphalt coating especially with respect to longer retention of the luster of the finish. These improved properties are due chiefly to our discovery that the incorporation of the organic iron compounds causes superior blending of the asphalt and resin into a homogeneous system as compared to the blending effect produced by other metallic compounds which function as driers. It will be seen, therefore, that with respect to the main object of the invention, the drying function of the iron compounds is incidental, because the drying function, if absent from the particular organic iron compound used, could be supplied by the addition of any of the known driers other than an iron drier. The blending power of iron driers in asphalt resin varnishes is evidenced by the large quantity of resin that may be incorporated into the asphalt varnish when organic iron compounds are used, as compared to the quantity that may be incorporated without the use of an organic metal compound or when other metallic driers are used. A "gallon" oil length, as used in the varnish trade, designates a gallon of oil per 100 lbs. of gum. By weight, this is generally about 8 lbs. of oil per 100 lbs. of gum. The term "gallon" or "gallon length", as used herein, designates 8 lbs. of modified polyhydric alcohol-polybasic acid resin per 100 lbs. of asphalt. For example, a five gallon asphalt-resin varnish contains forty parts by weight of resin to one hundred parts by weight of asphalt. With steam refined petroleum residue asphalts we have produced varnishes having acceptable gallon lengths of one hundred for resins ranging from 5% to 38% phthalic glyceride and from 95% to 62% linseed oil acid glycerides. In order to obtain good compatability it is not desirable to reduce the drying oil glyceride much below 62%.

"Acceptable gallon lengths" refers to the number of gallons of resin which are compatible with, and will produce a homogeneous mixture with 100 pounds of asphalt. One hundred gallon varnishes may also be made with resins in which a part of the phthalic glyceride has been replaced by rosin glyceride. Thus, we have produced 100 gallon varnishes with resins containing from 5 to 20% phthalic glyceride and 5 to 20% rosin glyceride, the remainder of the resin consisting of linseed oil acid glycerides. A resin (acid number 33.4) containing 38% phthalic glyceride and 62% linseed oil glycerides yields a twenty gallon varnish without a blending agent and with a lead-manganese resinate blending agent, whereas the incorporation of 1% iron as resinate produces a 75 gallon varnish. A resin (acid number 15.4) containing 10% phthalic glyceride, 15% rosin glyceride, and 75% linseed oil acid glyceride yielded with the same asphalt a 35 gallon varnish without a blending agent and a 40 gallon varnish with a lead-manganese resinate combination. The substitution of 1% iron for the lead-manganese resinate mixture resulted in a varnish of 100 gallon length.

It is to be understood that the glycerides mentioned refer, not to phthalic glyceride, drying oil acid glyceride and rosin glyceride separately, but to mixed phthalic-rosin-drying oil acid glyceride in which some of the hydroxyl groups of each glycerol molecule have probably been esterified by phthalic anhydride, some by rosin, and some by drying or semi-drying oil acids.

The systems with which the present invention is concerned, as will be apparent from the increased gallon lengths capable of being produced, are markedly more compatible than systems previously used in making asphalt varnishes. The higher gallon lengths, however, sometimes exhibit undesirable characteristics such as poor durability, tackiness, dullness, and the development of a blue color in the film. It is to be understood, therefore, that the present invention resides not in the production of asphalt varnishes of exceptional gallon length of resin, but in our discovery that the incorporation of the organic iron compounds into asphalt-resin varnishes results in improved durability up to 30 gallon lengths, or to 40 gallon lengths in case of the pigmented varnishes containing resins of high oil content. We have found that, in asphalt varnishes of not more than the gallon lengths mentioned, durability and compatibility generally go hand in hand, and, as previously pointed out, the resins included in the present invention are characterized by exceptional compatibility with asphalt.

The durability of the films yielded by the varnish, as well as the acceptable resin gallon lengths possible, will vary somewhat for asphalts from different sources. We prefer to use a petroleum residue asphalt which has been steam refined as distinguished from petroleum residue asphalt which has been refined by other methods, as for instance, by blowing with air. We have found that the most durable varnishes are produced from steam refined petroleum residue asphalt. The steam refined petroleum residue asphalt should preferably have a softening point between the approximate range of 150–250° F. as determined by the Ball and Ring Method described in A. S. T. M. standards, 1921, page 944, under the serial designation D—36—21. It is desirable, furthermore, that the steam refined petroleum residue asphalt have as high a melting point as possible within the range given in order to obtain with this type of asphalt the maximum durability and retention of luster on exposure to the weather. While we prefer to use the steam refined petroleum residue asphalt, previously referred to, it is possible to use other asphalts such as gilsonites and other natural bitumens.

Although glycerol has been used as the polyhydric alcohol and phthalic anhydride has been used as the polybasic acid in the above examples of polyhydric alcohol-polybasic acid resins falling within the scope of the present invention, other polyhydric alcohols, such as glycol, and other polybasic acids, as succinic acid, may be used. These resins may be made with any of the suitable drying oil acids in the manner indicated in the examples, or they may be made with the drying oils themselves, such as soya bean oil or perilla oil, by first heating the glycerol and oil together and then heating the glyceride so formed with the phthalic anhydride.

It is intended, therefore, that the term "oil" refers to drying as well as semi-drying oils, or the corresponding oil acids and that "oil modified polyhydric alcohol-polybasic acid resin" as used in the claims shall refer to resins made with either the drying or semi-drying oils, or with the equivalent amount of oil acids.

As indicated by the above examples, the varnishes made in accordance with this invention may include various types of polyhydric alcohol-polybasic acid resins modified with drying oils or drying oil acids, or with combinations of drying oils, drying oil acids and natural acidic resins such as rosin, and these resins may be of varying acid number. In general, however, the resins of lower acid number and the resins of shorter oil length form less satisfactory varnishes of the type disclosed herein, since they are not as compatible with asphalts as resins of higher acid number and resins of longer oil length.

Other solvents, such as toluol, xylol, and Hi-flash naphtha may be used instead of the turpentine mentioned in the examples.

The drying of these asphalt finishes may be effected by air drying or by baking, but better durability is usually obtained with baked finishes.

The coating compositions herein disclosed are of particular utility as a top coating for fabrics which are exposed to the weather and sun. These compositions are especially valuable as a coating for automobile top materials because of their resistance to deterioration and their capability of retaining an attractive appearance after long use.

When applying the composition to the automobile top material, usually rubber coated fabrics, we may use a one-coat system or a two-coat system. In the one-coat system, which is the simplest form of our invention, the asphalt coating composition is applied over the uncured rubber and then subjected to heating at a suitable temperature and for a sufficient time to vulcanize the rubber and to thoroughly fuse the varnish film. By this treatment we obtain on the surface of the goods a smooth, continuous film which is substantially inert and which remains for a long time unaffected by sunlight. The temperature and time of cure depend on the rubber compound, and especially on the kind of accelerator used. As a rule, the temperature will lie between 240° to 275° F., and the time of cure will be from 30 minutes to 3 hours. Usually, the composition when applied over rubber is baked for two and one-half hours at 250° F. It is preferred, however, because of the greater flexibility and better retention of gloss obtained first to apply a coating of a suitable intermediate varnish such as an oil varnish, as exemplified in the following examples:

*Example 16*

|  | Parts by weight |
|---|---|
| Carbon black | 2.50 |
| Bodied linseed oil and drier | 45.00 |
| Turpentine substitute | 52.50 |
|  | 100.00 |

*Example 17*

|  | Parts by weight |
|---|---|
| Carbon black | 2.50 |
| Bodied china wood oil and drier | 20.00 |
| Bodied linseed oil and drier | 20.00 |
| Petroleum residue asphalt | 3.50 |
| Turpentine substitute | 54.00 |
|  | 100.00 |

This intermediate coat may be "air-dried", if desired, that is, dried at room temperature, but it is more advantageous from the cost standpoint to use a "force-dry", that is, dry at an elevated temperature, but below the vulcanizing temperature. Thus, we usually dry the first coat varnish by heating it up to 250° F. to 270° F. in one hour, after which we apply the final asphalt varnish and finish by baking at a temperature of about 240° F. to 275° F. for such time as is required to complete the vulcanization of the rubber. Other intermediate varnishes, such as a suitable asphalt varnish, have also been used with excellent results. The characteristics desired in the asphalt depend somewhat on the manner in which the varnish is to be applied and dried. When the varnish is to be baked at the temperature used to vulcanize the rubber, as is the preferred practice, we prefer to use the steam refined petroleum residue asphalt previously mentioned. For varnishes which are to be air-dried or baked at lower temperatures, as temperatures lower than required for vulcanization of the rubber, harder asphalts should be used, the preferred being petroleum residue asphalts prepared by steam refining processes which melt about 200° °F. as determined by the Ball and Ring Method previously referred to. Among other asphalts especially suitable for varnishes to be air-dried or baked at low temperatures may be mentioned gilsonites and other natural bitumens.

In some cases it is advantageous, after applying the intermediate varnish coat, to bake at the vulcanizing temperature for a portion of the vulcanizing period and to complete the vulcanization of the rubber by baking at the same temperature after the final coat of asphalt varnish has been applied. This procedure somewhat shortens the total time required to complete the process, but it is important that care should be taken on the one hand to avoid over-vulcanization of the rubber, and on the other hand that the final coat should receive not less than about one hour treatment at the full vulcanizing temperature in order to produce the best results and to properly condition the asphalt varnish film. We do not wish to limit our invention to a process which involves baking the final asphalt coat of a two-coat system, since results are obtained with a two-coat system of which the first coat is a baked oil varnish and the second coat an air-dried asphalt varnish.

It will, therefore, be apparent that we have developed new and useful coated fabrics which possess improved capability of retaining a high luster over a long period of time as compared with materials heretofore available, and new and useful processes for producing same. While said processes and coated fabrics have been described in connection with rubber coated fabrics, since these represent the preferred embodiments of our invention, it is apparent that the finishes disclosed herein may be applied as a top coat to flexible sheet material in general, such as fabrics or leather. Our improved asphalt coating composition may also be used for the production of artificial leather by finishing coated materials other than rubber coated materials, such as nitrocellulose coated and linseed coated fabrics.

As many apparently widely different embodiments of this invention may be made without departing from the spirit and scope thereof, it is to be understood that we do not limit ourselves to the specific embodiments thereof except as defined in the appended claims.

We claim:

1. A coating composition comprising an organic solvent, asphalt, an oil modified polyhydric alcohol-polybasic acid resin, and an organic iron compound soluble in said resin and present in proportion to confer compatibility to the asphalt-resin mixture present in the composition, said organic iron compound being derived from an acid of the class consisting of oil fatty acids and resin acids.

2. A coating composition comprising an organic solvent, asphalt, a polyhydric alcohol-polybasic acid resin, and an organic iron compound soluble in said resin and present in proportion to confer compatibility to the asphalt-resin mixture present in the composition, said resin being a mixed ester comprising a monobasic acid modified polyhydric alcohol-polybasic acid ester, the composition of which may be calculated as from 5% to 38% polybasic acid ester, and from 95% to 62% monobasic acid ester, said organic iron compound being derived from an acid of the class consisting of oil fatty acids and resin acids.

3. A coating composition comprising an organic solvent, asphalt, a polyhydric alcohol-polybasic acid resin, and an organic iron compound soluble in said resin and present in proportion to confer compatibility to the asphalt-resin mixture present in the composition, said resin being a mixed ester of a polybasic acid, a fatty oil acid and natural resin acid with glyceral, the composition of which may be calculated as 5% to 20% polybasic acid ester, 5% to 20% resin acid ester, the remainder being oil acid glyceride, said organic iron compound being derived from an acid of the class consisting of oil fatty acids and resin acids.

4. A coating composition comprising an organic solvent, asphalt, a polyhydric alcohol-polybasic acid resin, and an organic iron compound soluble in said resin and present in proportion to confer compatibility to the asphalt-resin mixture present in the composition, said resin being a mixed ester, the composition of which may be calculated as about 10% phthalic glyceride, 15% rosin glyceride, and 75% drying oil, said organic iron compound being derived from an acid of the class consisting of oil fatty acids and resin acids.

5. A coating composition comprising an organic solvent, asphalt, a polyhydric alcohol-polybasic acid resin, and an organic iron compound soluble in said resin and present in proportion to confer compatibility to the asphalt-resin mixture present in the composition, said resin being a mixed ester of a polybasic acid, a fatty oil acid and natural resin acid with glycerol, the composition of which may be calculated as 5% to 20% polybasic acid ester, 5% to 20% resin acid ester, the remainder being oil acid glyceride, said organic iron compound being derived from an acid of the class consisting of oil fatty acids and resin acids, the resin and asphalt being present in said composition within the ratio of from 20 to 240 pounds of resin per 100 pounds of asphalt.

6. The composition set forth in claim 5 in which the organic iron compound is present in the proportion of from 0.5% to 4% iron based upon the weight of the resin.

7. As an article of manufacture, a fabric sheeting having a top coat of dried varnish comprising an organic iron compound and a homogeneous mixture of asphalt and oil modified polyhydric alcohol-polybasic acid resin, said organic compound being soluble in said resin and present in proportion to confer compatibility to the asphalt-resin mixture present in the composition.

8. As an article of manufacture, a rubber-coated fabric sheeting having a top coat of baked varnish comprising an organic iron compound and asphalt and oil modified polyhydric alcohol-polybasic acid resin in the proportion of 20 to 240 pounds of resin per 100 pounds of asphalt, said organic iron compound being derived from the class consisting of oil fatty acids and resin acids.

9. A coating composition comprising an organic solvent, asphalt, a natural resin acid modified-oil modified polyhydric alcohol-polybasic acid resin, and an organic iron compound soluble in said resin and present in proportion to confer compatibility to the asphalt-resin mixture present in the composition, said organic iron compound being derived from an acid of the class consisting of oil fatty acids and resin acids.

10. A coating composition comprising an organic solvent, asphalt, a rosin modified-oil modified polyhydric alcohol-polybasic acid resin, and an organic iron compound soluble in said resin and present in proportion to confer compatibility to the asphalt-resin mixture present in the composition, said organic iron compound being derived from an acid of the class consisting of oil fatty acids and resin acids.

ARTHUR N. PARRETT.
ALFONSO M. ALVARADO.